G. H. BRONSON.
Chicken-Coop.
No. 205,609. Patented July 2, 1878.
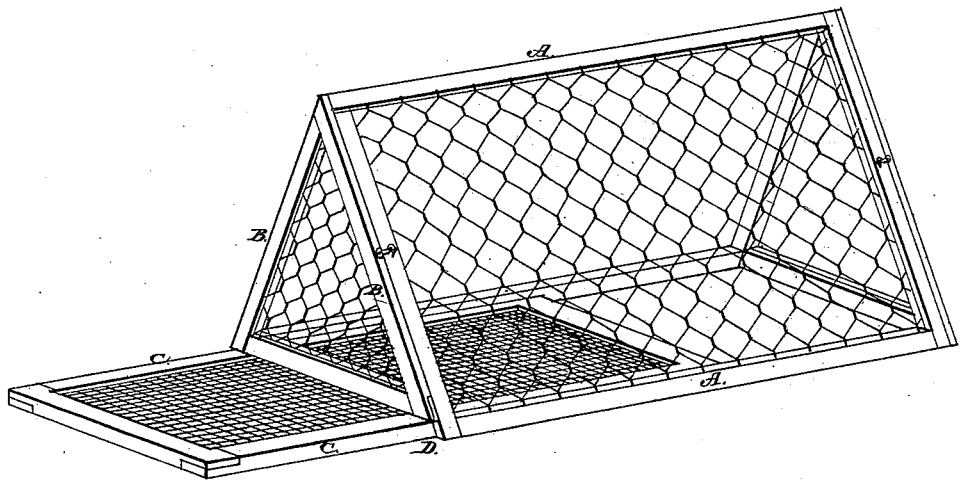

UNITED STATES PATENT OFFICE.

GEORGE H. BRONSON, OF BROOKLYN, NEW YORK.

IMPROVEMENT IN CHICKEN-COOPS.

Specification forming part of Letters Patent No. 205,609, dated July 2, 1878; application filed August 14, 1877.

*To all whom it may concern:*

Be it known that I, GEO. H. BRONSON, of the city of Brooklyn, county of Kings, and State of New York, have invented a new and useful Improvement in Chicken-Coops, which improvement is fully set forth in the following specification, reference being had to the accompanying drawing.

This chicken-coop is designed especially for the protection of quite young fowls from destruction by rats, weasels, &c., and may be made wholly or partly of wire-cloth or wire-netting. The frames may be of wire, iron, or wood, and for convenience, when not in use, the coop may be easily taken apart and put away, occupying but small space.

The accompanying drawing shows my improved coop set up ready for use, with the movable bottom drawn partly out.

To describe more particularly my invention, at A are shown two frames, two edges of which are brought together and doweled or pinned, the lower edges being extended, forming an inverted V. The ends B have small pins, which fit to the ends of the side frames, and at the center are shown hooks, which hold the ends firmly in place, forming the coop. These frames are covered with wire-cloth or wire-netting of any desired opening or mesh.

At C is shown a movable raised platform or metallic bottom, consisting of a frame covered with wire-cloth, and slides under the coop at opening D. The frame thus covered elevates the bottom from the ground, keeps the fowls dry and comfortable in bad weather, or allows them to the ground, as desired.

If the bottom be pushed entirely in, it becomes an entirely inaccessible coop to all burrowing animals and all intrusion.

I claim—

The construction of a coop for fowls, made wholly or partly of wire-cloth or wire-netting, in combination with a movable metallic bottom, substantially in the manner and for the purpose specified.

GEO. H. BRONSON.

Witnesses:
 B. W. COHEN,
 F. VETTER.